United States Patent [19]

Coopland, Jr.

[11] Patent Number: 5,193,787

[45] Date of Patent: Mar. 16, 1993

[54] SLEEVE AND BUSHING ASSEMBLY AND METHOD OF MANUFACTURING THE SAME

[75] Inventor: Alan F. Coopland, Jr., Streamwood, Ill.

[73] Assignee: Maremont Corporation, Carol Stream, Ill.

[21] Appl. No.: 695,419

[22] Filed: May 3, 1991

[51] Int. Cl.$^5$ ............................................. B60G 13/00
[52] U.S. Cl. .................................... 267/220; 267/293; 403/162
[58] Field of Search ............ 267/292, 293, 258, 140.5, 267/141.2, 220; 280/673; 403/227, 161, 162

[56] References Cited

U.S. PATENT DOCUMENTS

| | | | |
|---|---|---|---|
| 1,216,244 | 2/1917 | McDowell | 403/227 X |
| 1,931,945 | 10/1933 | Zerk | 403/227 X |
| 3,130,991 | 4/1964 | Piragino | 403/227 X |
| 4,139,246 | 2/1979 | Mikoshiba et al. | 280/673 X |

FOREIGN PATENT DOCUMENTS 620882  3/1949  United Kingdom ................ 403/227

Primary Examiner—Robert J. Oberleitner
Assistant Examiner—Lee W. Young
Attorney, Agent, or Firm—McAndrews, Held & Malloy, Ltd.

[57] ABSTRACT

A sleeve and bushing assembly for mounting a shock absorber to a motor vehicle and reducing road vibration experienced by the motor vehicle, as well as a method of manufacturing the assembly. The sleeve and bushing assembly includes an elastomeric bushing having first and second ends and an axial bore extending therebetween. A tubular cylindrical sleeve extends through the axial bore and terminates in a first shoulder at one end thereof and in a second shoulder and neck portion at the other end thereof. A first retaining washer is mounted on the sleeve adjacent the first shoulder and the first end of the bushing. A second retaining washer is mounted on the sleeve adjacent the second shoulder and its neck portion of the second end of the bushing. A spacer ring is mounted on the sleeve's neck portion adjacent to the second retaining washer. When assembled, the shoulder portion and the spacer ring member exert axial pressure on the first and second retaining washers which, in turn, serve to compress the bushing in an axial direction to maintain the bushing under a predetermined axial compression. An eye ring coaxially encircles the bushing between its ends to permit attachment of the sleeve and bushing assembly to a shock absorber.

7 Claims, 2 Drawing Sheets

SLEEVE AND BUSHING ASSEMBLY AND METHOD OF MANUFACTURING THE SAME

BACKGROUND OF THE INVENTION

This invention relates to a sleeve and bushing assembly and, in particular, to a sleeve and bushing assembly for use in mounting the ends of a shock absorber to a motor vehicle. The invention also relates to a method of manufacturing sleeve and bushing assemblies.

Sleeve and bushing assemblies have been used in the past for mounting a shock absorbers to motor vehicles. Such assemblies generally comprise an elastomeric bushing having an axial bore therethrough. A tubular, cylindrical sleeve extends through the axial bore. An eye ring radially encircles the bushing and is welded or otherwise fastened to the end of the shock absorber. Then the tubular sleeve is fit over a threaded stud on the vehicle body and secured in place with a threaded nut.

The above described, prior assemblies generally function for the purpose intended, and they have the advantage of being easy, and thus relatively inexpensive, to manufacture. Additionally the sleeves used in these prior assemblies may be made of different lengths for spacing the assemblies different distances away from the vehicle body if such spacing is desired.

These above described, prior assemblies have, however, several significant disadvantages. The bushing is allowed to and does move along the sleeve under load. Further the bushing has to be made from relatively "stiff" durometer materials, and this impairs the ability of the bushing to isolate vibrations and road noises. Also if spacers are required, the selection and placement of the spacer(s) are left to the discretion of the person who is installing the shock absorber on the motor vehicle, as opposed to the manufacturers of the sleeve and bushing assembly.

One proposed solution to the disadvantages of the above described, prior assemblies has been to dispose retaining washers on either side of the bushing and to stake or flare the ends of the sleeve to hold the washers in place. While this does prevent the bushing from moving along the sleeve, it makes the assembly more difficult to manufacture because two staking operations are required.

Another disadvantage with this proposed solution is that sleeves of differing lengths can be used by automotive technicians which results in changes in the amount of compression of the elastomeric bushing. Additionally, such prior sleeves require that each end must be staked to hold the retaining washers in place. If it is desired to mount the shock absorber a further distance away from the vehicle body than the length of the sleeve permits, spacers or washers must be used to achieve the desired distance, creating an opportunity for mounting error during assembly.

SUMMARY OF THE INVENTION

The present invention relates to an improved sleeve and bushing assembly which overcomes the aforementioned disadvantages of the above described, prior assemblies and the proposed solution. The present invention also relates to an improved method of manufacturing this sleeve and bushing assembly.

Specifically the improved assembly comprises an elastomeric bushing having first and second axial ends or faces and an axial bore within which is disposed a tubular cylindrical sleeve. The sleeve has a first shoulder at one end and a reduced outer diameter neck portion at its other end forming a second shoulder. Axial retaining washers are mounted on the sleeve: the first between the first shoulder and the first end of the bushing, and the second, adjacent the other end of the sleeve, abuts the second shoulder and the second end of the bushing. In sum, these washers abut each end or face of the bushing and serve to prevent the bushing from moving along the sleeve. This permits the bushing to be made from relatively "softer" durometer materials and assembled with a predetermined amount of compression. The retaining washers are also used to exert a constant, axial pressure or force on the bushing. The amount of tension or "squeeze" exerted on an elastomeric bushing, it has been discovered, plays an important role in the isolation of road vibrations and noise experienced by the vehicle body and the passenger. Hence the exertion of such a constant axial deflection, coupled with the use of a relatively "softer" durometer bushing, results in the improved sleeve and bushing assembly of the present invention affording superior isolation of road vibrations and noises due to road irregularities.

A spacer ring may also be disposed about the other end of the sleeve, that is, about the neck portion of the sleeve. The retaining washers each have a recessed annular portion adjacent to their central apertures. They each also have an offset flange whose radially inner edge projects toward the bushing. The diameters of the recess portion of the first and second retaining washers are slightly larger than the outer diameters of the first shoulder on the sleeve and the spacer ring, respectively.

The novel design of the assembly of the present invention permits the ready and facile use of sleeves of different lengths for spacing the assembly away from the vehicle body. This simplifies installation, as well as controlling the quality of the installed assembly, since the spacing may be built into the assembly at the time it is manufactured.

The improved sleeve and bushing assembly of the present invention is relatively easy, and thus relatively inexpensive, to manufacture as compared to the above described proposed solution. Its manufacture requires only one—as opposed to two, stacking operations to complete the entire assembly. A cylindrical eye ring encircles the bushing and permits the facile attachment of the bushing and sleeve assembly to a shock absorber by welding or other fastening means.

As noted, the present invention also includes an improved method of manufacturing such a sleeve and bushing assemblies. The improved method includes the steps of: fitting the elastomeric bushing into the eye ring; inserting the neck portion of the cylindrical sleeve into the bore of the bushing—where the first axial retaining washer is mounted on the sleeve, adjacent to the sleeve's first shoulder and between shoulder and the adjacent side of the bushing—so that the first end of the bushing firmly abuts the first washer and so that the leading edge of the neck portion of the sleeve protrudes a short distance beyond the second side of the bushing; placing a second axial retaining washer and a spacer ring adjacent to the other side of the bushing and in alignment with the longitudinal axis of the sleeve; exerting pressure on the spacer ring—in a direction parallel to the longitudinal axis of the sleeve—so as to compress the bushing until the second washer firmly abuts the second shoulder of the sleeve and until the cylindrical sleeve projects through the bore of the bushing and the spacer ring; and staking the neck portion of the sleeve so as to maintain the spacer ring, and thus the second washer on the sleeve, and so as to maintain the bushing under a predetermined constant axial compression or pressure.

Accordingly, it is an object of the present invention to provide an improved sleeve and bushing assembly for mounting the ends of shock absorbers onto motor vehicles, where the improved assembly affords a superior means for isolating and reducing road noise and vibration.

It is another object of the present invention to provide an improved sleeve and bushing assembly of the type described where the improved assembly maintains a constant axial deflection of the bushing without the need for threaded or welded components.

It is a further object of the present invention to provide an improved preassembled bushing and sleeve assembly which may be easily mounted to a vehicle and relatively inexpensively manufactured.

A still further object of the present invention is to provide an improved sleeve and bushing assembly of the type described where the improved assembly may employ sleeves of differing lengths.

Still another object of the present invention is to provide an improved method of manufacturing a sleeve and bushing assembly of the type described.

These and other objects and advantages of the present invention will become apparent from the following description.

BRIEF DESCRIPTION OF THE DRAWINGS

FIG. 5;

DETAILED DESCRIPTION OF THE PREFERRED EMBODIMENT

Figure 1:
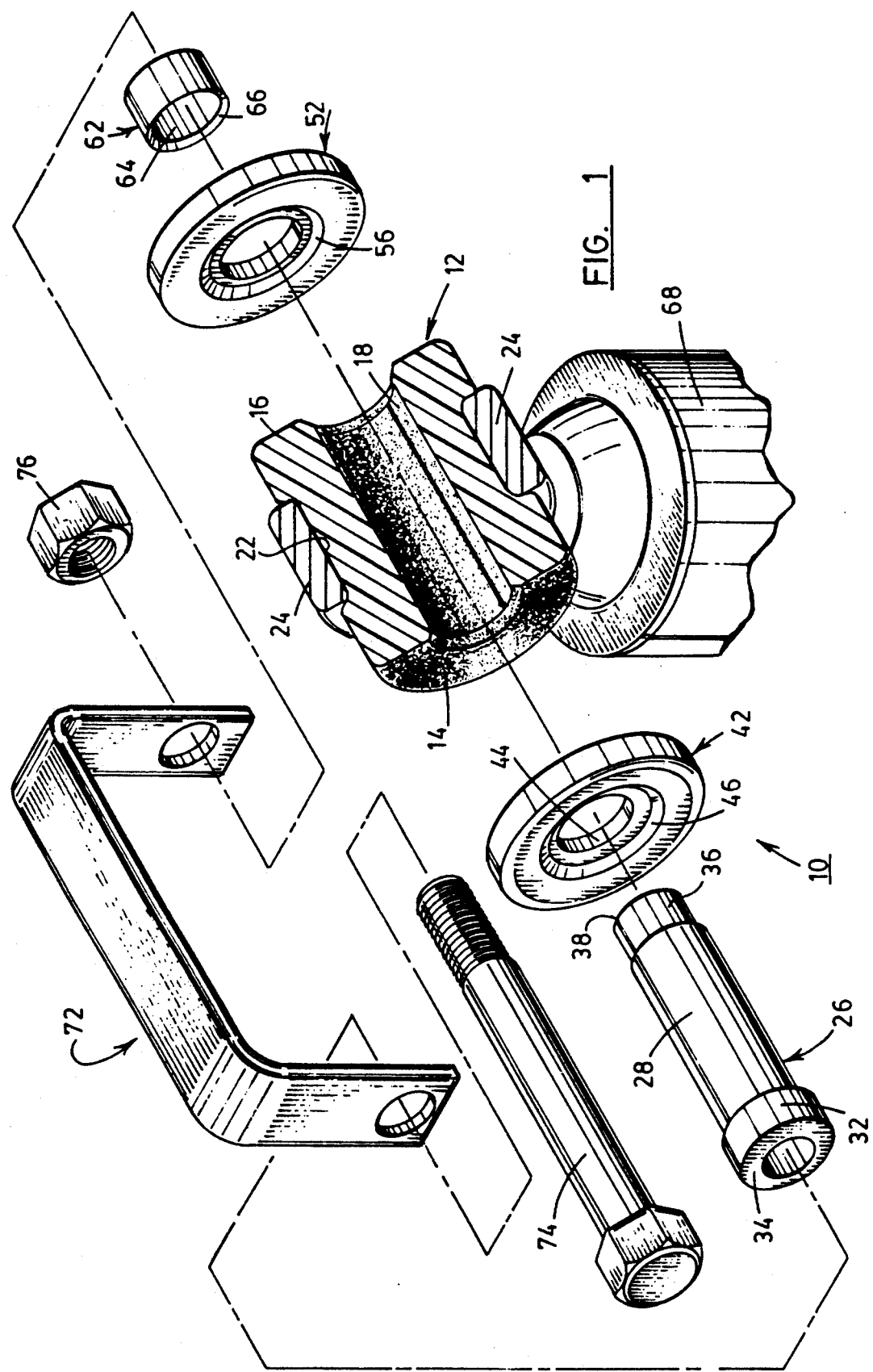
FIG. 1 is an exploded, perspective the sleeve and bushing assembly of the present invention.

Turning now to FIG. 1, a sleeve and bushing assembly according to a preferred embodiment of the invention is shown generally at 10. The assembly includes an elastomeric, substantially cylindrical bushing 12 having first end or end face 14 and second end or end face 16. The bushing also has an axial bore 18 that extends between its ends 14 and 16. The ends 14 and 16 may be flat and parallel to each other or preferably, may constitute spherical segments with the radius of curvature of each being located at the intersection of the central longitudinal axis of the bushing and the plane of the other end of the bushing 12.

An annular recessed portion 22 circumscribes the bushing 12 midway between its ends 14 and 16. The bushing is preferably made of natural rubber having a shore durometer hardness of 42±4, although other rubbers or other elastomeric materials and durometers may be used.

Figure 9:
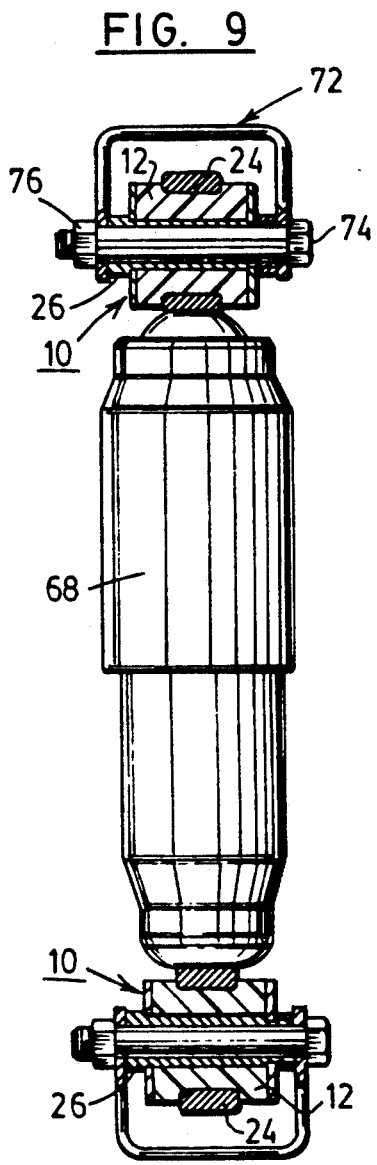
FIG. 9 is a perspective, partial vertical cross-sectional view of the sleeve and bushing assembly of the present invention employed to mount a shock absorber.

A metal eye ring 24 holds the bushing 12. Specifically the bushing 12 is inserted into and held within the central opening of the eye ring 24. The diameter of the opening of the eye ring is slightly less than the outer diameter of the bushing 12, adjacent to its ends, and is slightly greater than the diameter of the recessed portion 22. The length of the eye ring 24, in the direction parallel to the longitudinal axis of its central opening, is the same as the length of the annular recess portion 22, in the direction parallel to its longitudinal axis, so that when the bushing 12 is inserted into the eye ring 24, the eye ring is tightly disposed in the recessed portion 22. An air press or other such means is required to fit the eye ring 24 over the bushing 12 until the eye ring rests within the portion 22 as shown in FIGS. 1 and 9.

Figure 2:
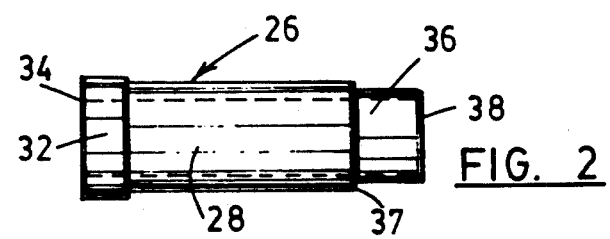
FIG. 2 is a side elevational view of the sleeve.

A tubular cylindrical sleeve 26, shown best in FIG. 2, extends through the axial bore 18 of the bushing 12. This sleeve has a uniform inner diameter and includes a central portion 28. It has a larger diameter shoulder 32 at one end 34 thereof and a reduced diameter neck 36 extending axially beyond a second shoulder 37 at its other end 38. The sleeve 26 is preferably made of steel and may be machined from tubing or fabricated by cold forming.

Figure 3:
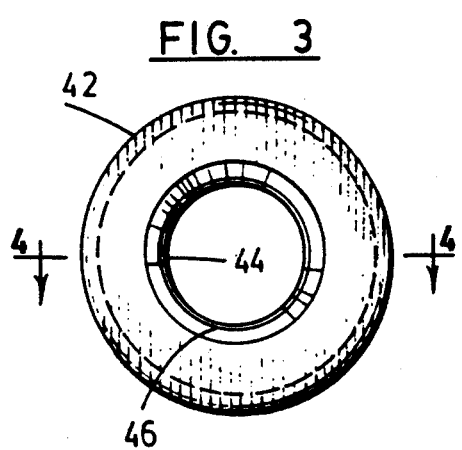
FIG. 3 is an elevational view of the side of the first retaining washer that is adjacent to and faces the first shoulder of the sleeve.
Figure 4:
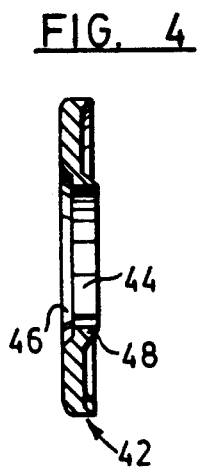
FIG. 4 is a cross-sectional view taken along the line 4—4 of FIG. 3.

A first retaining washer 42 is mounted on the sleeve 26 so that it contacts the shoulder 32. The washer 42 includes a central aperture 44 whose diameter is slightly greater than the outer diameter of the central portion 28 of the sleeve 26 to facilitate its mounting on the sleeve. As illustrated in FIGS. 3 and 4, the first retaining washer 42 has a central annular recessed portion 46 surrounding its central aperture 44. This recessed portion includes a radially inwardly extending flange 48 formed therein adjacent to the aperture 44. The radially inner edge of the flange 48 is offset toward the end 14 of the bushing 12 so that the recessed portion 46 faces away from the bushing end 14.

The annular recessed portion 46 of the washer 42 faces the shoulder 32 of the sleeve 26 and has an outer diameter that is slightly greater than the outer diameter of the shoulder 32 so that the adjacent end of the shoulder 32 fits within the annular recessed portion 46 of the retaining washer 42 and abuts the flange 48 of the retaining washer.

The central portion 28 of the sleeve 26 has an outer diameter that is greater than that of the bore 18 of the bushing 12. An air press or other such means is used to insert the sleeve 26, having the first retaining washer 42 mounted thereon adjacent to the shoulder 32, into the bore 18 The sleeve 26 extends through the bore 18 such that the leading edge of the end 38 of the sleeve is without the bore 18 and the end face 16 of the bushing 12.

Figure 5:
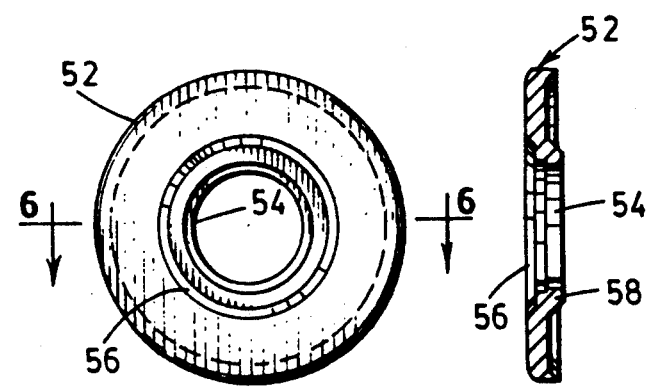
FIG. 5 is an elevational view of the side of the second retaining washer that faces away from the bushing.
Figure 6:
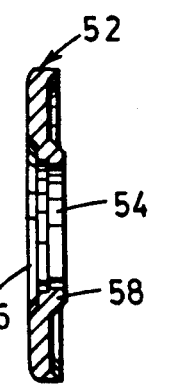
FIG. 6 is a cross-sectional view taken along

As best seen in FIGS. 5 and 6, a second retaining washer 52 having a central aperture 54, is positioned adjacent to the end face 16 of the bushing 12 and in coaxial alignment with the bore 18. The retaining washer 52 includes a central annular recessed portion 56 surrounding its central aperture 54. This recessed portion 56, like recessed portion 46 of the washer 42, includes a radially inwardly extending flange 58 formed therein adjacent to the aperture 54. The radially inner edge of the flange 58 is offset toward the end 16 of bushing 12 so that the recessed portion 56 faces away from the bushing end 16.

Figure 8:
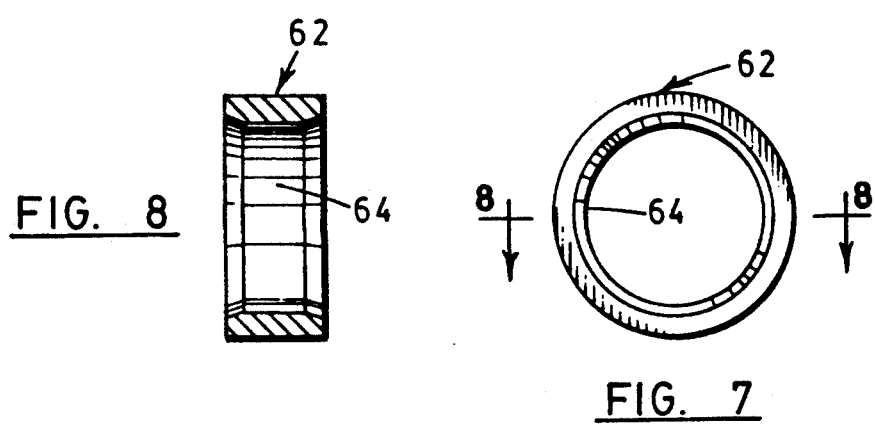
FIG. 8 is a cross-sectional view taken along the line 8—8 in FIG. 7.
Figure 7:
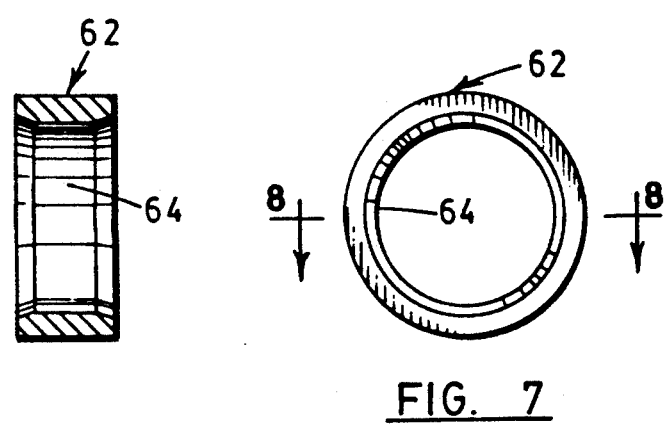
FIG. 7 is an elevational view of the side of the spacer ring that is disposed adjacent to the second retaining washer.

As shown on FIGS. 7 and 8, a tubular spacer ring 62 is disposed about the neck portion 36 of the sleeve 26 and within the recessed portion 56 so that it abuts the flange 58 of the second retaining washer 52. The ring 62 has inwardly chamfered end surfaces and includes a central aperture 64 that is slightly larger than the diameter of the neck portion 36 of the sleeve and an inner diameter of aperture 54 of the second retaining washer 52. The outer diameter of the spacer ring 62 is such that the ring closely fits within the recessed portion 56.

The preferred method of manufacturing the sleeve and bushing assembly 10 of the present invention is completed by contacting the spacer ring 62 with a conventional hydraulic press (not shown) that has a conventional flaring tool with a piloting nose portion. This contact with the spacer ring and the activation of the press, puts pressure on the second retaining washer 52. This, in turn, compresses the bushing 12 until the flange 58 of washer 52 firmly abuts shoulder 37 of sleeve 26, the end 38 of the sleeve 26 emerges from the bore 18 of the bushing and becomes at least flush with the outer face of the spacer ring 62. The flaring tool then flares the outer end 38 of the neck portion 34 so that the retaining washers 42 and 52 maintains a constant axial, predetermined deflection of the bushing 12, and the spacing between washers 42 and 52.

In use and as shown in FIGS. 1 and 9, the eye ring 24 of the sleeve and bushing assembly 10 may be joined to the ends of a conventional shock absorber, such as shown at 68 by welding, or the like, in a conventional manner. The sleeve and bushing assembly 10 is then attached to a clevis 72 or similar attachment means located on the vehicle suspension and chassis, by way of a threaded stud 74, that extends through the sleeve 26, and a nut 76. As will be appreciated by those skilled in the art, the sleeve and bushing assembly of the present invention results in a bushing assembly having a known preloaded in compression. It will be understood that various changes and modifications can be made in the above-described embodiment of the invention without departing from the spirit thereof, particularly as defined by the following claims.

What is claimed is:

1. An improved shock absorber sleeve and bushing assembly for use in mounting a shock absorber, which has eye ring attached to one end thereof, to a motor vehicle comprising:
    (a) an elastomeric, substantially cylindrical bushing having first and second ends, having an axial bore extending between the first and second ends of the bushing, and having an outer peripheral surface of a predetermined diameter such that said eye ring may coaxially encircle said bushing between the ends of the bushing;
    (b) a cylindrical sleeve that extends through said axial bore of the bushing, and that has uniform diameter portion which has first and second ends, with the first end of the uniform diameter portion of said sleeve terminating in a first shoulder that has an outer diameter greater than the uniform diameter portion, and with the second end of said sleeve terminating in a second shoulder defined between the uniform diameter portion and a reduced diameter neck portion which extends axially between the second shoulder and a distal end of the sleeve;
    (c) a first retaining washer mounted on the uniform diameter portion of said sleeve adjacent to and abutting said first shoulder and the first end of the bushing;
    (d) a second retaining washer mounted on said sleeve and abutting the second end of the bushing; and
    (e) a spacer ring that has first and second end surfaces and that is mounted on and circumferentially surrounding said neck portion, with the first end surface of the spacer ring abutting said second retaining washer; and
    (f) means for exerting a predetermined, constant axial pressure on the second end of the bushing in an axial direction so as to thereby create a consistent axial deflection of the bushing.

2. The improved sleeve and bushing assembly of claim 1 wherein said second retaining washer has a central aperture, an annular recessed portion surrounding the central aperture, and an offset flange adjacent to the central aperture; and wherein said annular recessed portion of the second retaining washer has a diameter greater than the outer diameter of the spacer ring so that said spacer ring fits in said annular recessed portion of the second retaining washer and the first end surface of the spacer ring abuts said offset flange.

3. The improved sleeve and bushing assembly of claim 2 wherein the first retaining washer has a central aperture, an annular recessed portion surrounding the central aperture, and an offset flange adjacent to the central aperture; and wherein said annular recessed portion of the first retaining washer has a diameter greater than the outer diameter of the first shoulder of the sleeve so that said first shoulder fits in said annular recessed portion of the first retaining washer.

4. The improved sleeve and bushing of claim 3 wherein the distal end of said neck portion is flared outwardly and firmly abuts the second end surface of the spacer ring to maintain the bushing under constant axial deflection.

5. The improved sleeve and bushing assembly of claim 1 wherein the first retaining washer has a central aperture, an annular recessed portion surrounding the central aperture, and an offset flange adjacent to the central aperture; and wherein said annular recessed portion of the first retaining washer has a diameter greater than the outer diameter of the first shoulder of the sleeve so that said first shoulder fits in said annular recessed portion of the retaining washer and abuts said offset flange.

6. The improved sleeve and bushing of claim 1 wherein the distal end of said neck portion is flared outwardly and firmly abuts the second end surface of the spacer ring so as to maintain the bushing under constant axial deflection.

7. A method of manufacturing a preassembled, shock absorber bushing and sleeve assembly for use in mounting a shock absorber, which has an eye ring attached at one end thereof, to a motor vehicle comprising the steps of:
    fitting an elastomeric bushing, having first and second ends and an axial bore extending therebetween, into said eye ring such that said eye ring coaxially circumscribes said bushing between said first and second ends;
    positioning a first retaining washer onto a cylindrical sleeve, which has a uniform diameter portion having first and second ends, which has a first shoulder at the first end thereof and a second shoulder axially spaced from the first shoulder and adjacent to the second end thereof, and which has a reduced diameter neck portion that has a distal end, and that extends from the second shoulder to the distal end thereof, so that said first retaining washer abuts against the first shoulder;

inserting the sleeve into the axial bore of said bushing until the first retaining washer abuts against the first end of the bushing and the second end of uniform diameter portion of said sleeve is adjacent to the second end of the bushing;

positioning a second retaining washer and a cylindrical spacer ring, which has inner and outer end faces and which has a preselected axial length between said inner and outer faces, onto the other end of the sleeve so that said second retaining washer is adjacent to the second end of the bushing, so that the inner face of said spacer ring abuts the second retaining washer, and so that the spacer ring and said second retaining washer are in coaxial alignment with the axial bore of the bushing;

exerting pressure on said spacer ring and said second retaining washer until the bushing is axially compressed by a predetermined amount between the first and second retaining washers and the distal end of the neck portion of the sleeve is substantially flush with the outer face of the spacer ring; and flaring the distal end of the neck portion of the sleeve against the outer face of the spacer ring to maintain the bushing under the predetermined amount of axial compression.

* * * * *